(12) United States Patent
Suzuki et al.

(10) Patent No.: US 8,335,245 B2
(45) Date of Patent: *Dec. 18, 2012

(54) CODE DIVISION MULTIPLE ACCESS MOBILE COMMUNICATION SYSTEM

(75) Inventors: May Suzuki, Kokubunji (JP); Nobukazu Doi, Hachioji (JP); Takashi Yano, Tokorozawa (JP)

(73) Assignee: FIPA Frohwitter Intellectual Property AG, Gruenwald (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/836,237

(22) Filed: Jul. 14, 2010

(65) Prior Publication Data

US 2010/0278148 A1 Nov. 4, 2010

Related U.S. Application Data

(63) Continuation of application No. 10/869,920, filed on Jun. 18, 2004, now Pat. No. 7,778,310, which is a continuation of application No. 09/518,690, filed on Mar. 3, 2000, now Pat. No. 6,879,571, which is a continuation of application No. 09/257,002, filed on Feb. 25, 1999, now Pat. No. 6,507,576.

(30) Foreign Application Priority Data

May 13, 1998 (JP) ..................................... 10-129995

(51) Int. Cl.
*H04B 1/00* (2006.01)
(52) U.S. Cl. .......................... 375/150; 370/342; 370/335
(58) Field of Classification Search .......... 375/130–150, 375/326, 356, 362; 370/342, 326, 335
See application file for complete search history.

(56) References Cited

U.S. PATENT DOCUMENTS

| | | |
|---|---|---|
| 4,969,159 A | 11/1990 | Belcher et al. |
| 5,280,472 A | 1/1994 | Gilhausen et al. |
| 5,692,155 A | 11/1997 | Iskiyan et al. |
| 5,790,588 A | 8/1998 | Fukawa et al. |
| 5,907,673 A | 5/1999 | Hirayama et al. |
| 6,018,667 A | 1/2000 | Ghosh et al. |
| 6,167,037 A | 12/2000 | Higuchi et al. |
| 6,208,632 B1 | 3/2001 | Kowalski et al. |
| 6,226,315 B1 | 5/2001 | Sriram et al. |
| 6,370,134 B1 | 4/2002 | Aramaki |

(Continued)

FOREIGN PATENT DOCUMENTS

EP 693834 A1 1/1996

(Continued)

OTHER PUBLICATIONS

Translation of The Institute of Electronics, Information and Communication Engineers, Technical Report of IEICE DSP98-116, SAT96-111, RCS96-122 (Jan. 1997).

(Continued)

*Primary Examiner* — Jean B Corrielus
(74) *Attorney, Agent, or Firm* — Mattingly & Malur, PC

(57) ABSTRACT

In a mobile communication system using a code division multiple access (CDMA) method, spreading code detection and frame/slot timing synchronization (cell search) is conducted by using a long code masked symbol. The spreading factor of the long code masked symbol is set to a value lower than spreading factors of other ordinary symbols. As a result, it becomes possible to reduce the circuit scale and power dissipation of the mobile terminal and raise the speed of cell search.

4 Claims, 11 Drawing Sheets

U.S. PATENT DOCUMENTS

| | | |
|---|---|---|
| 6,385,232 B1 | 5/2002 | Terashima |
| 6,459,724 B1 | 10/2002 | Yoneyama |
| 6,665,277 B1 | 12/2003 | Sriram |
| 6,754,251 B1 | 6/2004 | Sriram et al. |
| 6,891,817 B2 | 5/2005 | Miya et al. |
| 2004/0057414 A1 | 3/2004 | Sriram |
| 2005/0213643 A1 | 9/2005 | Iwamoto et al. |
| 2005/0213644 A1 | 9/2005 | Iwamoto et al. |
| 2010/0323747 A1* | 12/2010 | Tiedemann et al. .......... 455/522 |

FOREIGN PATENT DOCUMENTS

| | | |
|---|---|---|
| EP | 0825737 | 2/1998 |
| EP | 0388910 | 4/1998 |
| EP | 0852430 | 7/1998 |
| JP | 61-248698 | 5/1986 |
| JP | 8-79131 | 3/1996 |
| JP | 08-307316 | 11/1996 |
| JP | 09-261121 | 10/1997 |
| WO | WO99/12273 | 3/1999 |

OTHER PUBLICATIONS

K. Higuchi et al, "Fast Cell Search Algorithm in DS-CDMA Mobile Radio Using Long Spreading Codes", IEEE, 47th, May 4-7, 1997, pp. 1430-1434.

IEEE, K. Higushi et al, "Fast Cell Research Algorithm in DS-CDMA Mobile Radio Using Long Spreading Codes", May 4, 1997, pp. 1430-1434.

* cited by examiner

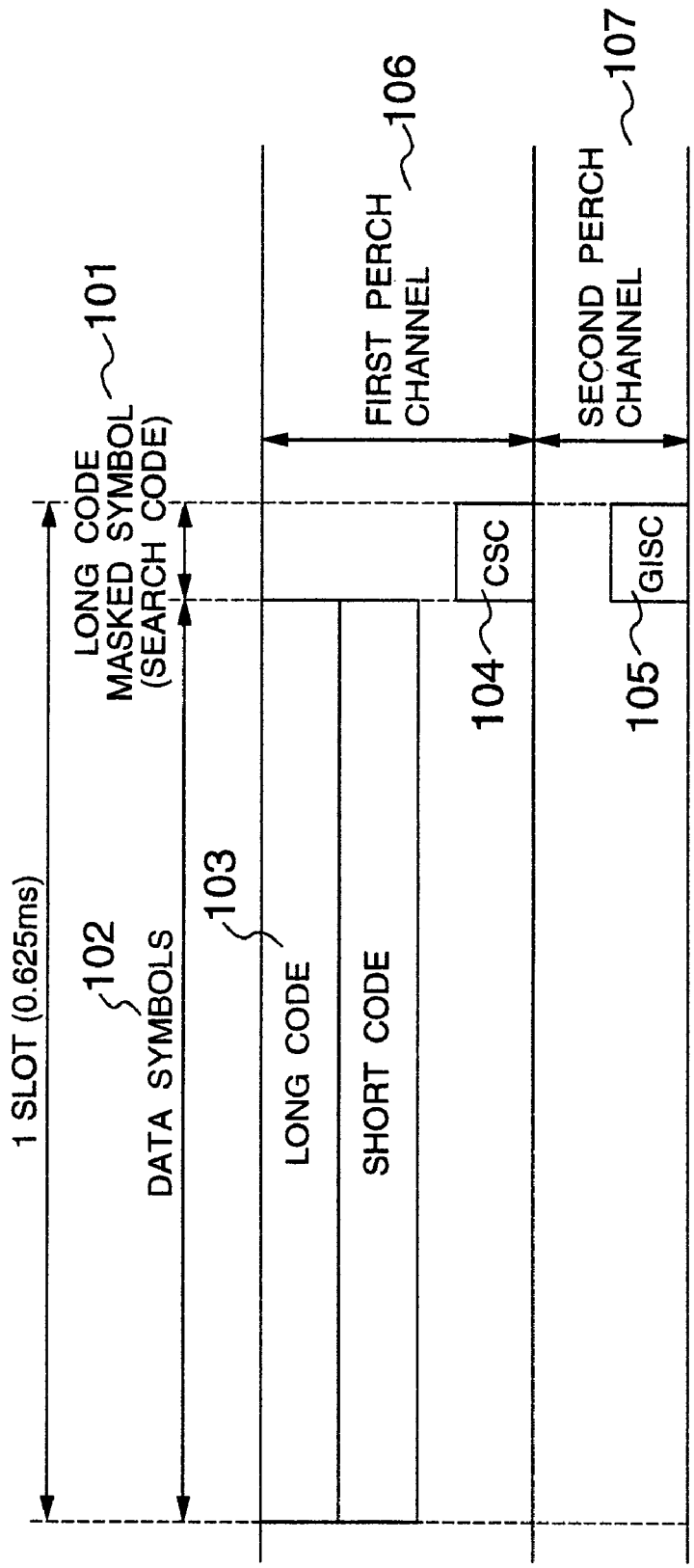

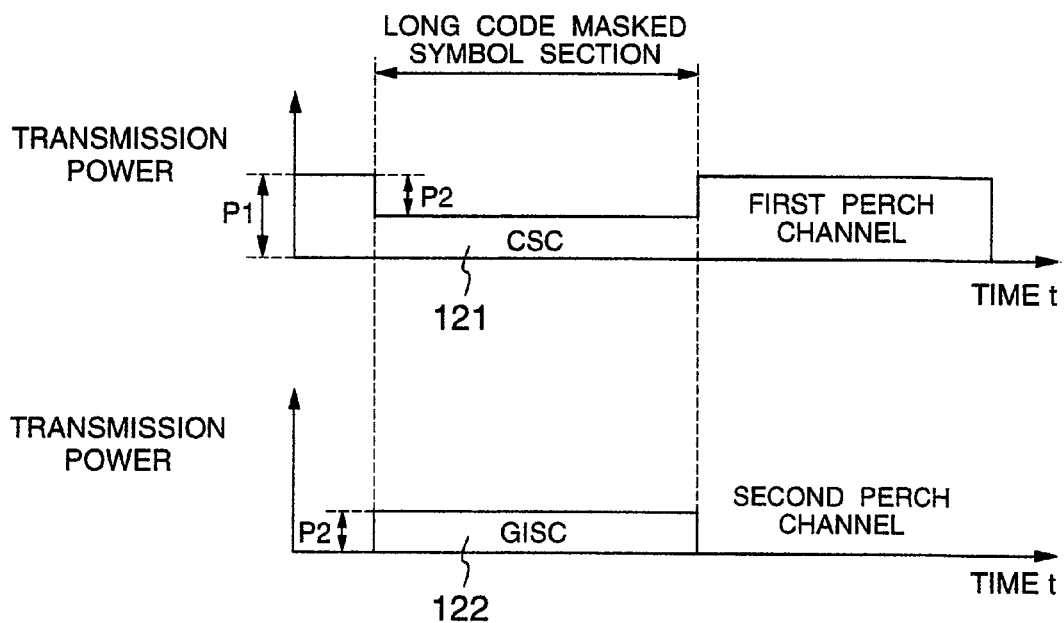
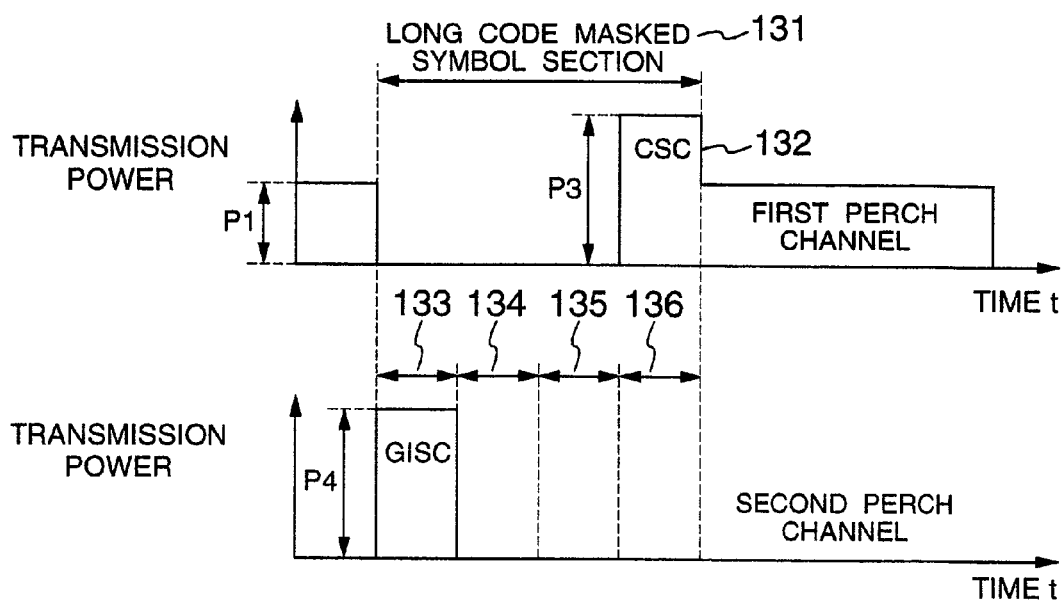

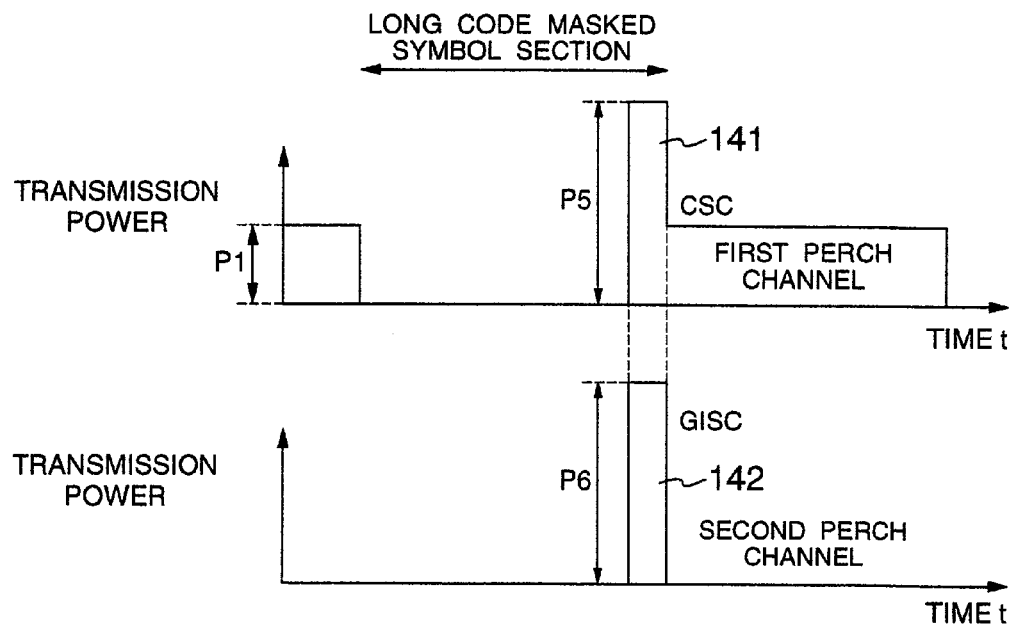
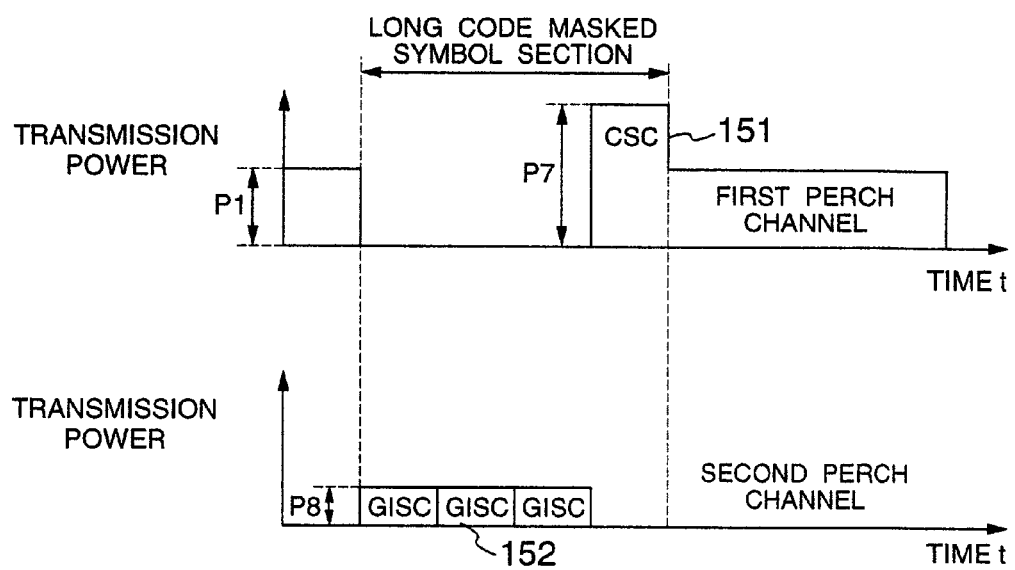

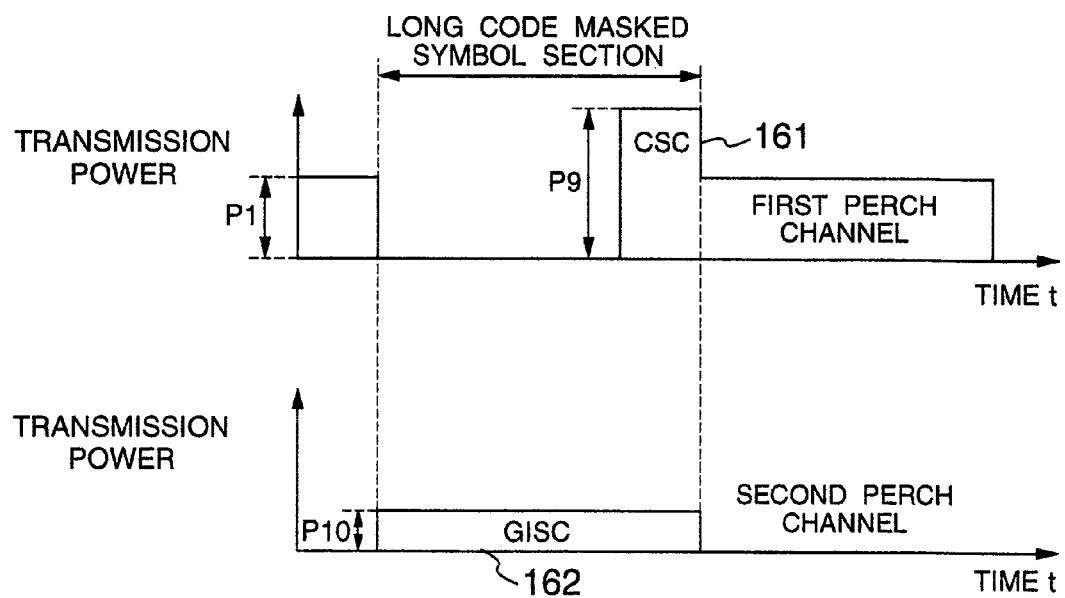

FIG. 7

CSC SYMBOL LENGTH, NUMBER OF MF TAPS, AND REQUIRED CELL SEARCH TIME

| SYMBOL LENGTH (SPREADING FACTOR) | NUMBER OF MF TAPS | TIME FOR TIMING SYNCHRONIZATION | TIME FOR GISC DETECTION | TIME FOR LONG CODE DETECTION | TOTAL |
|---|---|---|---|---|---|
| 64 CHIPS | 64 TAPS | 30 ms | 20 ms | 10-20 ms | 60-70 ms |
| 128 CHIPS | 64 TAPS | 60 ms | 20 ms | 10-30 ms | 90-110 ms |
| | 128 TAPS | 30 ms | 20 ms | 10-30 ms | 60-80 ms |
| 256 CHIPS | 64 TAPS | 120 ms | 20 ms | 10-50 ms | 150-190 ms |
| | 128 TAPS | 60 ms | 20 ms | 10-50 ms | 90-130 ms |
| | 256 TAPS | 30 ms | 20 ms | 10-50 ms | 60-100 ms |

CODE DIVISION MULTIPLE ACCESS MOBILE COMMUNICATION SYSTEM

This is a continuation application of U.S. patent application Ser. No. 10/869,920 filed Jun. 18, 2004, now U.S. Pat. No. 7,778,310; which is a continuation application of Ser. No. 09/518,690, filed Mar. 3, 2000, now U.S. Pat. No. 6,879,571; which is a continuation application of U.S. Ser. No. 09/257,002, filed Feb. 25, 1999, now U.S. Pat. No. 6,507,576, the contents of which are hereby incorporated by reference into this application.

BACKGROUND OF THE INVENTION

1. Field of the Invention

The present invention relates to a code division multiple access (CDMA) mobile communication system. In particular, the present invention relates to a cell search method using a long code masked symbol (search code) in perch channels.

2. Description of the Related Art

When a mobile terminal starts communication, or a mobile terminal moves from one base station area (cell) in which the mobile terminal is currently conducting communication to an adjacent cell (i.e., in the case of hand over) in CDMA mobile communication systems, it is necessary to conduct spread code detection or frame/slot timing synchronization. Such processing is called cell search.

As for an example of a conventional cell search method, a method of spreading only one symbol located at the end of a slot by using a special short code called long code masked symbol instead of the ordinary long code and short code is described in Technical Report of IEICE (the Institute of Electronics, Information and Communication Engineers) DSP-96-116, SAT96-111, RCS96-122 (1997-01).

This cell search method using the long code masked symbol will now be described. The cell search uses perch channels shown in FIG. 1. The term "perch channels" means control channels for notifying reverse link interference power measured at the base station, system frame number, and the like. Furthermore, the perch channels are transmitted always with constant transmission power. Since a control signal of the perch channels is used also as a reference signal of timing synchronization conducted between the base station and the mobile terminal, the control signal of the perch channels is spread as described below. As for the perch channels, a first perch channel and a second perch channel are multiplexed. In a long code masked symbol position (search code position) 101 of a first perch channel 106, a CSC (Common Short Code), i.e., a first search code 104 is mapped. In a long code masked symbol position 101 of a second perch channel 107, a GISC (Group Identification Short Code), i.e., a second search code 105 is mapped. In a data symbol section 102 (a section obtained by removing a long code masked symbol section (search code section) from one slot section), a control signal transmitted to the mobile terminal is spread by a long code and short code 103.

The long code is a long period spreading code assigned uniquely to the base station. The short code is a short period spreading code assigned uniquely to each of channels under communication (including the control channel and transmission channel). The long code has a long code length and includes many kinds. In order to facilitate its timing synchronization, therefore, the long code is classified into a plurality of groups. The GISC is a short period code provided so as to correspond to the classification of the long code. In the case where the mobile terminal is to conduct timing synchronization of the perch channels, the mobile terminal lightens the load of synchronization of the long code used by the base station (i.e., decreases time, circuit means, electric power, etc. required for the timing synchronization), by detecting the GISC and narrowing down the long code to a fixed range (i.e., by limiting candidates for the long code which may be used). The CSC is a short period spreading code defined uniquely to the mobile communication system.

The detection of the long code and the frame/slot timing used by the base station, utilizing the perch channels is conducted as follows: (1) the mobile terminal despreads the perch channels by using the CSC, and detects the slot timing on the basis of the height of the correlation value; (2) the mobile terminal conducts despreading in all GISCs in conformity to the synchronized slot timing, and detects the GISC on the basis of the height of the correlation value; (3) the mobile terminal conducts despreading by using all long codes belonging to a group associated with the GISC, and detects the long code on the basis of the height of the correlation value.

The format and transmission power of the perch channels of the conventional method are shown in FIG. 2. The symbol rate of the perch channels is 16 kbps (spreading factor being 256) and constant in all sections including the long code masked symbol. In the long code masked symbol section in which the second perch channel is transmitted, transmission power P1 of the first perch channel is lowered by transmission power P2 of the second perch channel. Thereby, transmission power of the perch channels after multiplexing is constant.

In the conventional system which conducts spreading process in the long code masked symbol section at the same symbol rate as in the data symbol section, it took the longest time in a first stage (slot timing synchronization) of the cell search. In order to conduct timing synchronization in a short time, a matched filter (MF) capable of deriving correlation results at a plurality of timing instants at once is used in many cases.

FIG. 13 shows time required in each stage of the cell search in the case where cell search is conducted by despreading the perch channels having a spreading factor of 256, by use of a MF with 64 chips. The stage requiring the longest time is slot timing synchronization 1301. For attaining faster cell search, it is an indispensable subject to shorten the time required for timing synchronization. In timing synchronization using the MF, correlation values at all timing instants in one symbol (256 chips) section are accumulated by using CSCs of a plurality of slots, thereby conducting slot timing synchronization at high precision. For example, correlation values derived for CSCs of 48 slots are accumulated. In FIG. 13, one accumulation value with respect to timing instants of 64 chips which is the same in number as the number of taps of the MF is derived in one cycle 1301 of timing synchronization.

If the MF with 64 taps is used, coefficient mode switchover becomes necessary in order to derive correlation values at all timing instants. This results in a problem that the time required for timing synchronization, in turn the time required for cell search becomes longer. On the other hand, if a MF with 256 taps is used, then the received signal can be despread with coefficients corresponding to one symbol set in the MF intact. Since the coefficient mode switchover thus becomes unnecessary, correlation at all timing instants can be derived at high speed. However, both the gate size and power consumption of the MF become very large.

SUMMARY OF THE INVENTION

In order to conduct the cell search at high speed while suppressing the gate size and the power consumption, the spreading factor of the long code masked symbol is made smaller than spreading factors of other portions of the perch channels.

In particular, a symbol rate according to typical number of taps of the MF used in the mobile terminal is determined. For example, in the case where the spreading factor of the mask symbol is 64, timing synchronization is conducted by using a MF with 64 taps. In this case, the symbol length coincides with the number of taps of the MF. With coefficients corresponding to one symbol set in the MF intact, therefore, it is possible to conduct despreading of the received signal and conduct search of all timing instants in the 64 chip section. Without increasing the gate size and power consumption, fast cell search thus becomes possible.

By referring to detailed description of preferred embodiments described below and accompanied drawing, these or other objects, features, and advantages will become more apparent.

BRIEF DESCRIPTION OF THE DRAWING

FIG. 1 is a diagram showing a channel format of perch channels;

FIG. 2 is a diagram showing a channel format and transmission power of perch channels of a conventional system;

FIG. 3 is a diagram showing a channel format and transmission power of perch channels of a first embodiment;

FIG. 4 is a diagram showing a channel format and transmission power of perch channels of a second embodiment;

FIG. 5 is a diagram showing a channel format and transmission power of perch channels of a third embodiment;

FIG. 6 is a diagram showing a channel format and transmission power of perch channels of a fourth embodiment;

FIG. 7 is a diagram showing shortening of the search time, and reduction of the circuit scale and transmission power;

DESCRIPTION OF THE PREFERRED EMBODIMENTS

Figure 8:
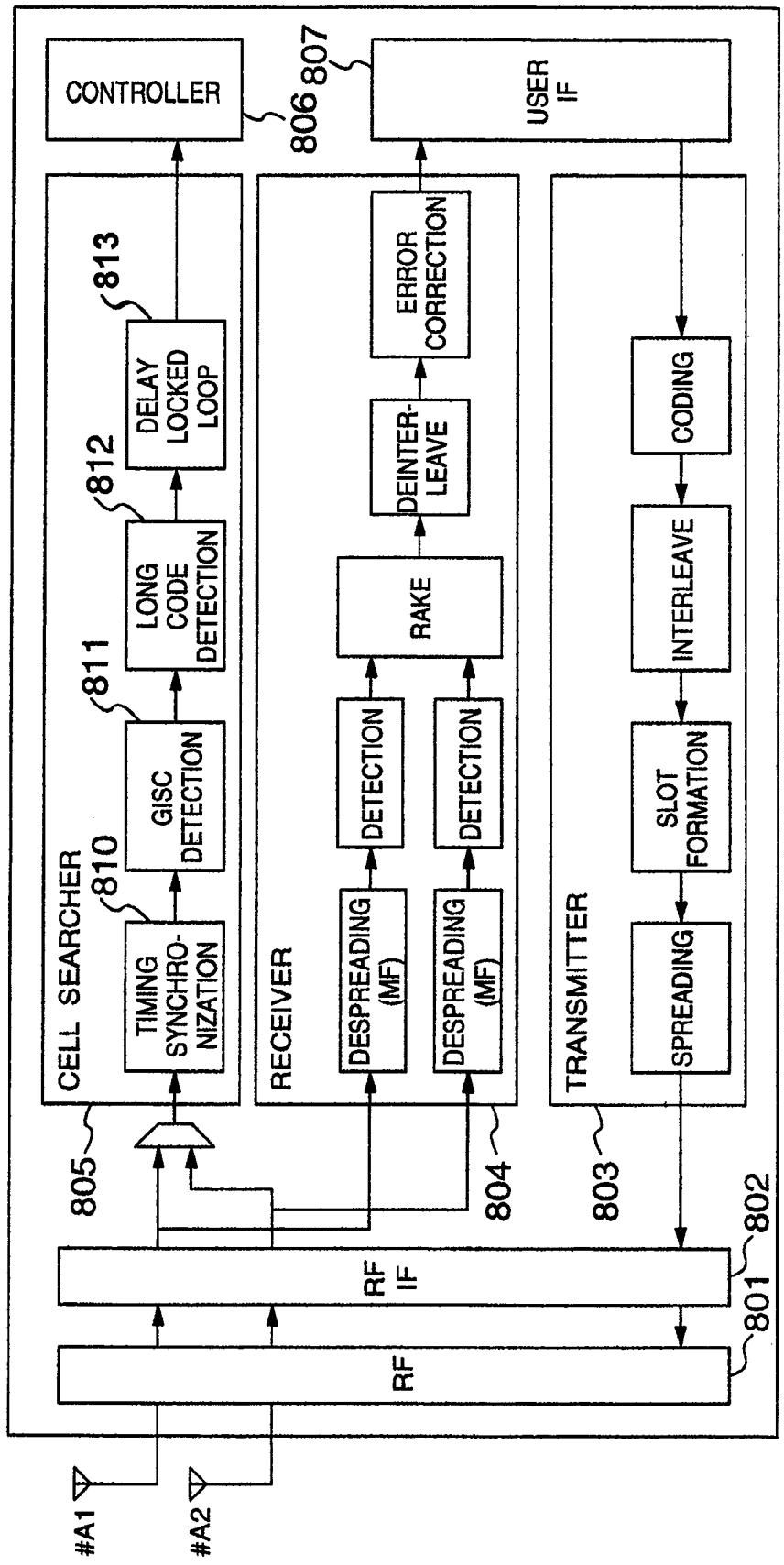
FIG. 8 is a configuration diagram of a mobile terminal.

First of all, the configuration of a mobile terminal used in a CDMA mobile communication system according to the present invention will be described by referring to FIG. 8. A received signal of a carrier frequency received from an antenna is lowered in frequency by an RF unit 801. The received signal of the baseband is inputted to a cell searcher 805 and a receiver 804 via an RF interface 802. The cell searcher 805 conducts the above described cell search. The receiver 804 conducts despreading, error correction and the like of physical channels other than the perch channels. The decoded received signal is outputted via a user interface 807, and subjected to subsequent processing. A transmission signal to be transmitted to the base station is inputted to a transmitter 803 via the user interface 807. The transmitter 803 conducts coding and spreading of the transmission signal. A controller 806 conducts initial value setting in various units and timing management by using a DSP (Digital Signal Processor).

Figure 9:
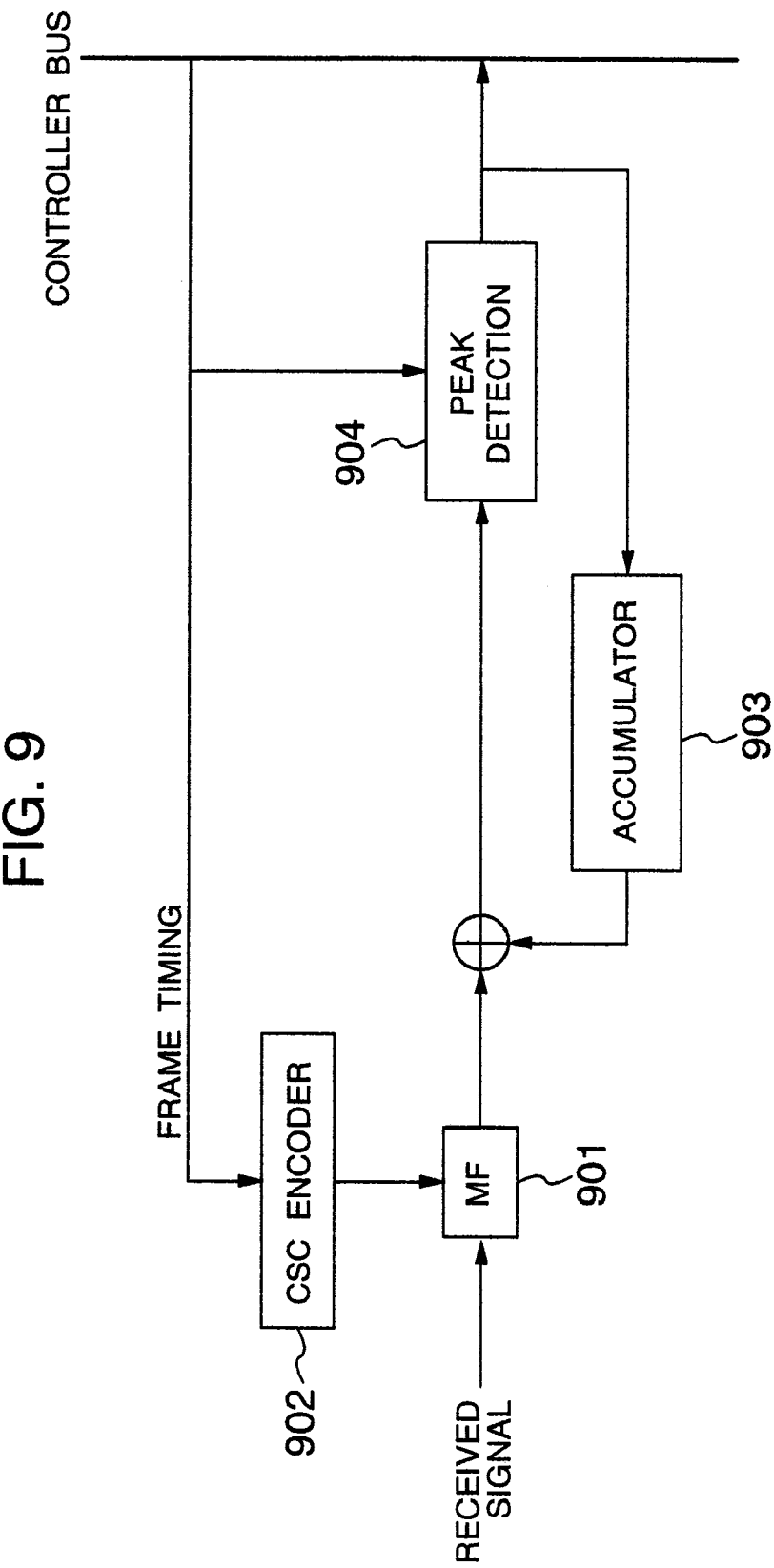
FIG. 9 is a diagram showing a configuration example of a cell search timing synchronization unit of a mobile terminal.

FIGS. 9 to 12 show configuration examples of blocks 810-812 of FIG. 8. FIG. 9 shows the configuration of a timing synchronizer 810. In the timing synchronizer 810, it is necessary to derive correlation values of timing corresponding to one symbol. Therefore, an MF 901 capable of providing correlation results at a plurality of timing instants at a time is used. As for coefficients of the MF 901, CSC generated from a CSC encoder 902 is used. An accumulator 903 accumulates correlation values outputted from the MF for a plurality of slots. A peak detector 904 detects such a timing as to maximize the accumulated correlation values, as slot timing.

Figure 10:
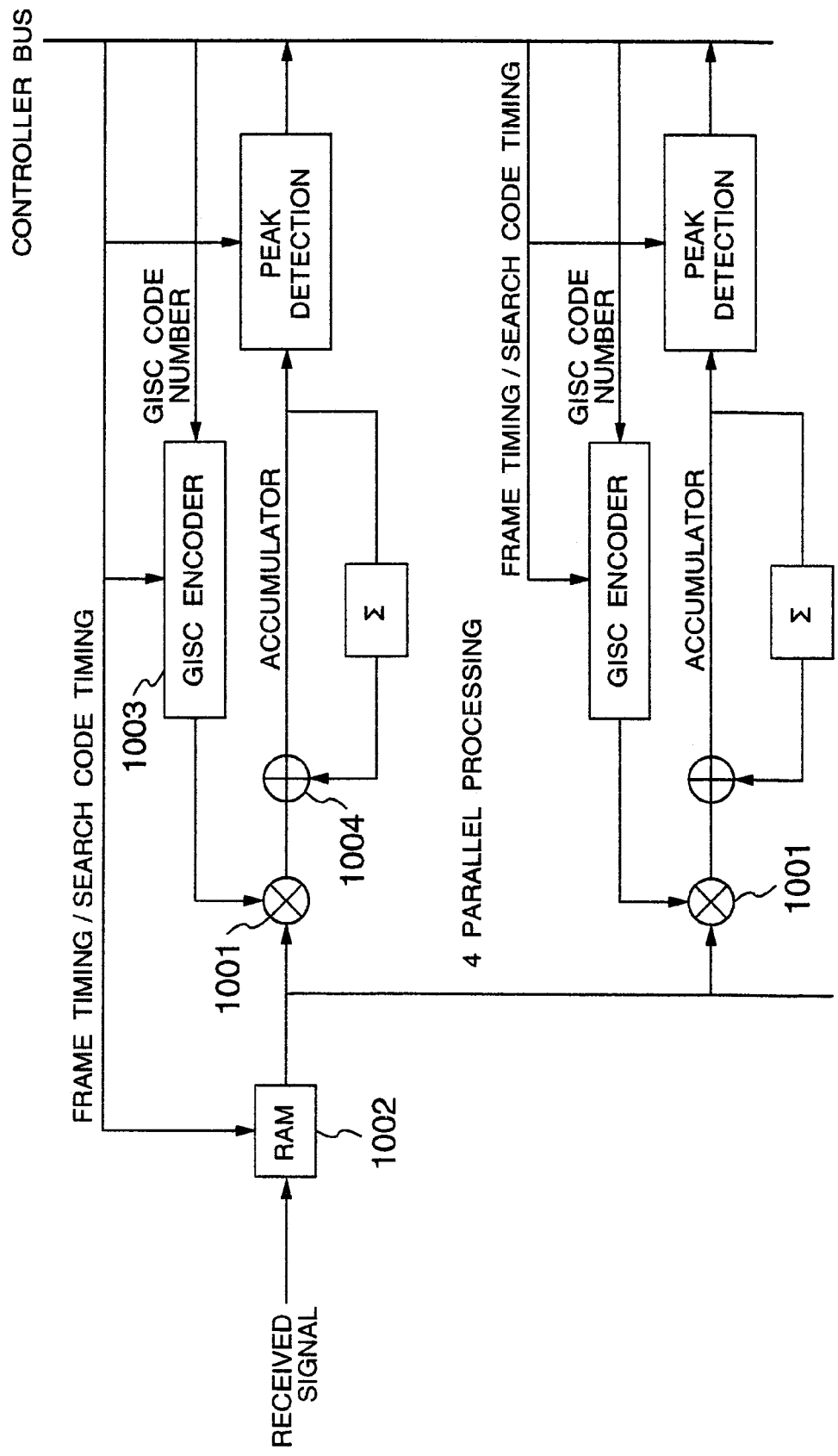
FIG. 10 is a diagram showing a configuration example of a cell search GISC detection unit of a mobile terminal.
Figure 11:
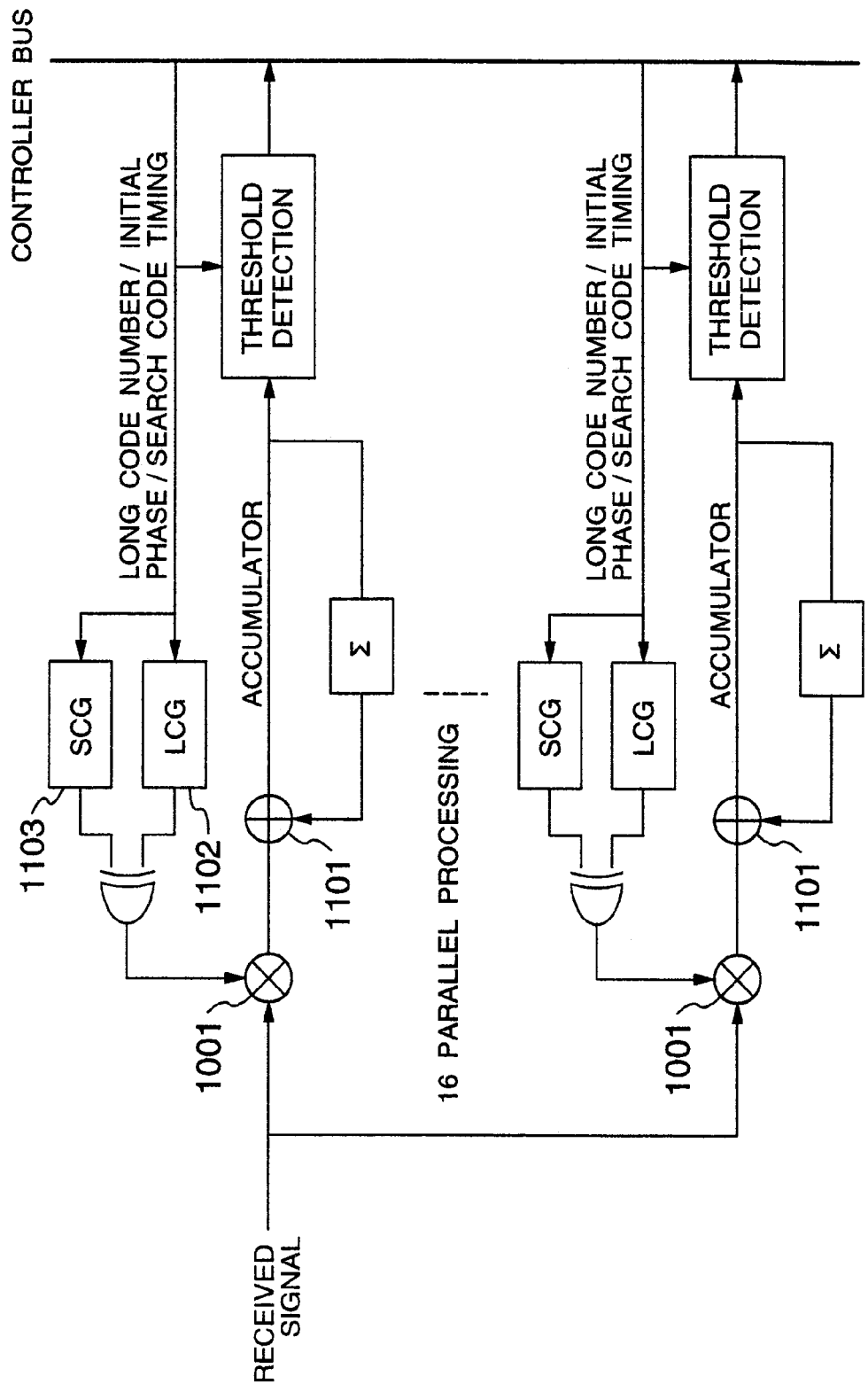
FIG. 11 is a diagram showing a configuration example of a first long code detection unit of a mobile terminal.
Figure 12:
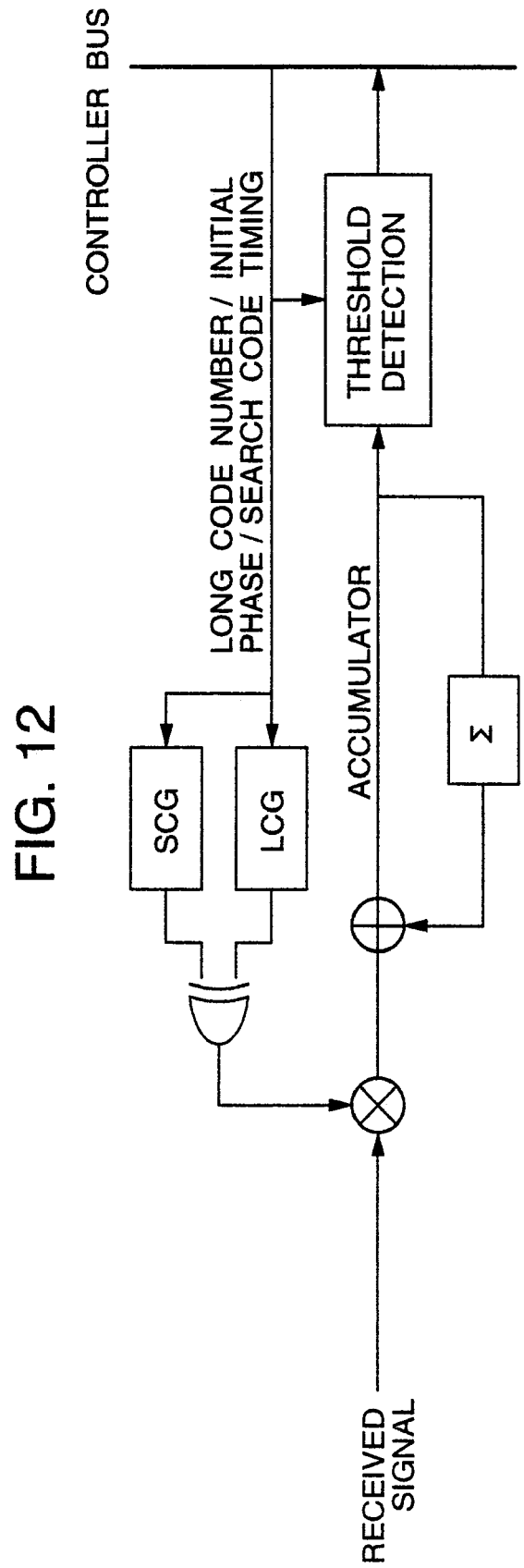
FIG. 12 is a diagram showing a configuration example of a second long code detection unit of a mobile terminal.
Figure 13:
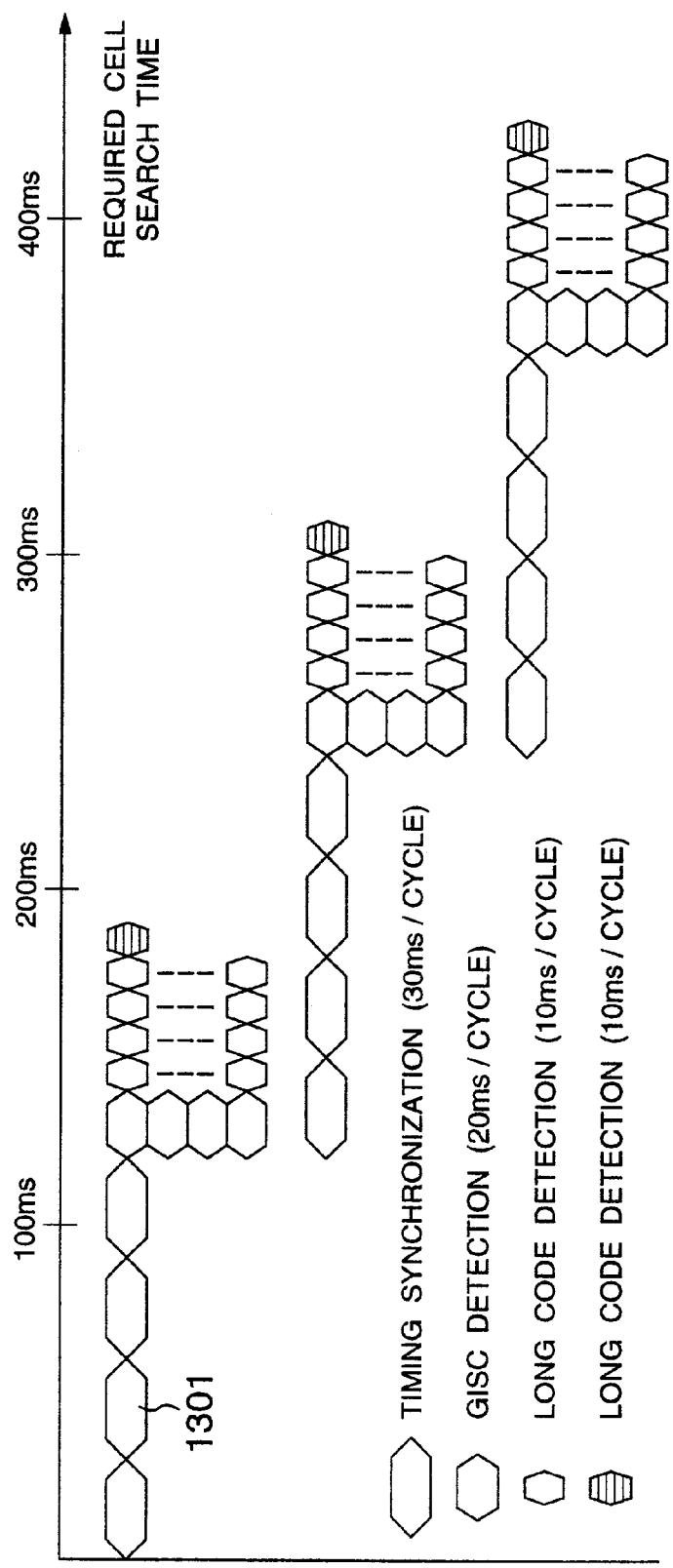
FIG. 13 is a diagram showing time required at each stage of the cell search.

FIG. 10 shows a configuration example of a GISC detection unit 811. FIG. 11 shows a configuration example of a first long code detection unit. FIG. 12 shows a configuration example of a second long code detection unit. A long code detection unit 812 includes a first long code detection unit and a second long code detection unit. In these circuits, frame/slot timing is already known by a timing detection unit. By arranging correlators 1001 in parallel for conducting despreading at one detected timing instant, high speed processing can be conducted efficiently.

The GISC detection unit 811 (FIG. 10) stores a received signal of a long code masked symbol in a RAM 1002. GISCs are specified in a GISC encoder 1003 one after another by the DSP. Correlation for each chip is thus derived. A correlation value in one symbol is derived by an accumulator 1004. Such processing can be conducted at high speed by suitably conducting parallel processing. By selecting the highest one of the derived correlation values, the GISC is detected.

The first long code detection unit (FIG. 11) calculates correlation values over approximately 10 symbols, and detects a long code used by the base station out of long codes belonging to a class corresponding to the detected GISC. Long codes specified in a long code generator 1102 one after another by the DSP are multiplied by a short code of the perch channels generated by a short code generator 1103. Correlation of each timing is derived by a correlator 1001. Correlation values corresponding to 10 symbols are accumulated by an accumulator 1101. This processing is conducted in parallel with different long codes. On the basis of a result of accumulation of correlation values over approximately 10 symbols, a probable long code is designated.

For the long code designated by the first long code detection unit, the second long code detection unit (FIG. 12) conducts processing similar to that of the first long code detection unit over one frame section and outputs the result to delay locked loop 813. In the case where a predetermined accumulation value has been obtained, the cell search is completed.

A CDMA communication system performing a cell search method using the long code mask symbol will now be described centering around an example in which only the long code masked symbol portion of the perch channels typically transmitted at 16 Ksps (spreading factor 256) is made to have a spreading factor of 64.

The spreading factor is not limited to 64. Similar effects can be obtained so long as the spreading factor is less than 256.

As a first embodiment, FIG. 3 shows a channel format and transmission power in the case where spreading factors of the CSC and GISC are made smaller (64 in the example) than those of other symbols of the perch channels, and the CSC and GISC are inserted at different timing instants. In order to prevent other ordinary symbol portions from being affected, a masked symbol section 131 is made to have 256 chips in the same way as the conventional system. The CSC and GISC may be inserted in any section of four sections (133, 134, 135 and 136) obtained by dividing the mask symbol section at intervals of 64 chips. In the case where the symbol length of the GISC becomes short and consequently the number of GISCs is not enough for the number of classes of the long code which GISCs are assigned to, it is also possible to adopt such a method that long code identification groups are sorted out according to which of the four insertion sections they are inserted. In the masked symbol section, sections other than those of CSC and GISC are provided with no symbols.

If the symbol length is shortened, the number of times of possible accumulation times decreases. For obtaining the same receiving sensitivity, therefore, the transmission power must be raised. However, the perch channels are always subjected to transmission with constant power. In addition, the long code masked symbol portion is poor in orthogonality, and therefore, tends to exert interference power to other channels. Therefore, it is desirable to suppress the transmission power as low as possible. In the present embodiment, therefore, the CSC and GISC are not multiplexed, but the CSC and GISC are transmitted by time division in the long code masked symbol portion. Even if the spreading factor is reduced to ¼ at this time, transmission power P3 of the CSC is twice the transmission power P1 of the conventional technique and the same reception sensitivity is obtained. The same is true of the transmission power P4 of the GISC.

As a second embodiment, FIG. 4 shows a channel format and transmission power in the case where the spreading factors of the CSC and GISC are made sufficiently small (16 in the example) as compared with other symbols of the perch channels, and the CSC and GISC are multiplexed and transmitted. It is necessary to make transmission power P5 of the CSC and transmission power P6 of the GISC large so as to correspond to the spreading factors. If the symbol rate of channels other than perch channels is fast, then the number of perch channels which are affected by the fact that the perch channel power is increased will become large. In such a case, by multiplexing the CSC and GISC to shorten the section in which the transmission power becomes large as in the present embodiment, although the influence of the perch channels on other channels may be large, the shortening of the affecting symbol section surely causes influence as a whole to be lightened.

As a third embodiment, FIG. 5 shows a channel format and transmission power in the case where the spreading factors of the CSC and GISC are made sufficiently small (64 in the example) as compared with other symbols of the perch channels, and the GISC is repeated a plurality of times (three time in the example). By transmitting the GISC repetitively n times, the number of accumulation times is increased, and accordingly transmission power P8 of the GISC of one time is equal to 1/n of transmission power P7 of the CSC. As a result, influence on other channels is suppressed.

As a fourth embodiment, FIG. 6 shows a channel format and transmission power in the case where the spreading factor of the CSC is made smaller than that of the GISC (in the example, the spreading factor of the CSC is 64 and the spreading factor of the GISC is 256). In the above described three stages of the cell search, the GISC detection can be conducted by despreading only at timing designated from the CSC, and a correlator is used instead of the MF in many cases (as shown in FIG. 10, for example). As in the present embodiment, therefore, the speed of the search can be raised while suppressing the interference on other channels, by making the spreading factor of the CSC affecting the number of taps of the MF small and making the spreading factor of the GISC larger than it in order to suppress the transmission power.

In FIG. 7, there is shown a list of time required at each stage of the cell search obtained when the spreading factor of the long code masked symbol and the number of taps of the MF are changed.

By thus making the spreading factor of the long code masked symbol small, the time required for timing synchronization can be made shorter than that of the conventional method, and the number of taps of the MF can be shortened, resulting in reduced gate size and power consumption.

The present invention has been disclosed in connection with the preferred embodiments. Those skilled in the art can apply various modifications to the embodiments on the basis of the disclosure. All modifications existing within the true spirit and scope of the present invention are incorporated in the claims.

The invention claimed is:

1. A mobile terminal used in a code division multiple access mobile communication system, in which a base station transmits a control signal via a perch channel formed such that a long period code assigned to said base station and a first short period code are mapped in a first section of one slot of said perch channel and a predetermined short period code is mapped in a second section of said one slot, said mobile terminal comprising:
   a radio frequency (RF) unit for converting a received signal of a carrier frequency received from an antenna to a baseband signal; and
   a correlator connected to said RF unit and arranged to receive said baseband signal, the correlator including a code generator for generating said predetermined short period code and arranged to calculate a correlation value for said baseband signal by using said predetermined short period code to establish slot timing synchronization,
   wherein a symbol length of said predetermined short period code has a smaller value than a symbol length of said first short period, and
   wherein in said second section are mapped a second short period code, and a third short period code being one of a plurality of short period codes each corresponding to classification of the long period code spreading said first section.

2. A mobile terminal according to claim 1, wherein said second short period code is a short period code common to base stations included in the mobile communication system, and said third short period code is one of a plurality of short period spreading codes each corresponding to classification of said long period code.

3. A mobile terminal used in a code division multiple access mobile communication system in which a base station transmits a control signal via a per channel formed such that a long period code assigned to said base station and a first short period code is mapped in a first section of one slot of said perch channel and a second short period code and a third short period code are mapped in a second section of said one slot, comprising:
   a radio frequency (RF) unit for converting a received signal of a carrier frequency received from an antenna to a baseband signal; and
   a correlator including a code generator arranged to generate said second short period code in response to a timing signal for calculating a correlation value for said baseband signal, wherein said received signal includes said control signal, said long period code being assigned to said base station and said first short period code being assigned to each channel of said base station, and said second short period code having a spreading factor smaller than said first short period code and said third short period code having a spreading factor not greater than said first short period code, and wherein said correlator calculates the correlation value for said control signal by use of said second short period code.

4. A mobile terminal used in a code division multiple access mobile communication system, comprising:

radio frequency (RF) unit for converting a received signal of a carrier frequency received from an antenna to a baseband signal; and a correlator including a code generator arranged to generate a predetermined short period code in response to a control signal, the correlator for calculating a correlation value for said received signal using said predetermined short period code, wherein said received signal includes said control signal, a first section of one slot of said control signal having mapped in it a long period code assigned to said base station and a short period code assigned to each channel of said base station, a second section of said one slot having mapped in it said predetermined short period spreading code, and a period of said predetermined short period code is smaller than a period of said short period code mapped in said first section.

* * * * *